(12) United States Patent
Nifong et al.

(10) Patent No.: US 10,474,781 B2
(45) Date of Patent: Nov. 12, 2019

(54) VIRTUAL HIERARCHICAL LAYER USAGE

(71) Applicant: Synopsys, Inc., Mountain View, CA (US)

(72) Inventors: Gary B Nifong, Durham, NC (US); Jun Chen, Cary, NC (US); James Lewis Nance, Raleigh, NC (US); Zhen Ren, Morrisville, NC (US); Ying Shi, Chapel Hill, NC (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/634,695

(22) Filed: Feb. 27, 2015

(65) Prior Publication Data

US 2015/0339430 A1 Nov. 26, 2015

Related U.S. Application Data

(60) Provisional application No. 62/006,607, filed on Jun. 2, 2014, provisional application No. 62/006,657, filed on Jun. 2, 2014, provisional application No. 62/006,092, filed on May 31, 2014, provisional application No. 62/006,069, filed on May 31, 2014,
(Continued)

(51) Int. Cl.
*G06F 17/50* (2006.01)

(52) U.S. Cl.
CPC ......... *G06F 17/5072* (2013.01); *G06F 17/50* (2013.01); *G06F 17/5009* (2013.01); *G06F 17/5081* (2013.01); *G06F 17/5068* (2013.01); *G06F 2217/12* (2013.01); *Y02P 90/265* (2015.11)

(58) Field of Classification Search
CPC ............. G06F 17/5081; G06F 17/5072; G06F 2217/12; H01L 23/528
USPC .............................. 716/50–55, 118–119, 139
See application file for complete search history.

(56) References Cited

U.S. PATENT DOCUMENTS

| | | |
|---|---|---|
| 5,281,558 A | 1/1994 | Bamji et al. |
| 5,309,371 A | 5/1994 | Shikata et al. |

(Continued)

OTHER PUBLICATIONS

"Virtual Layer Generation During Failure Analysis", U.S. Appl. No. 14/604,694, filed Jan. 24, 2015, Synopsys Inc.
(Continued)

*Primary Examiner* — Nghia M Doan
(74) *Attorney, Agent, or Firm* — Alston & Bird LLP

(57) ABSTRACT

Layout simulation and verification of a semiconductor chip can require extensive design rule checking (DRC) and design rules for manufacturing (DRM) analysis of the design in order to ensure proper operation. DRC and DRM can be expensive in terms of computational time and resource usage. To mitigate some of the cost, a virtual layer can be constructed for a cell instance identified in the semiconductor design. Shapes including rectangles and polygons can be determined which traverse the cell instance and are from other hierarchical layers of the design. The shapes can be combined to generate a virtual layer used for simulation, validation, DRC, DRM, etc. The virtual layer can be augmented with traversing shape information from other instances of the cell. The rectangles, polygons, and complex polygons can be combined to simplify the virtual layer. Multiple virtual layers can be generated for the simulation and validation processes.

26 Claims, 11 Drawing Sheets

Related U.S. Application Data provisional application No. 62/006,083, filed on May 31, 2014, provisional application No. 62/002,808, filed on May 24, 2014.

(56) References Cited

U.S. PATENT DOCUMENTS

| | | | |
|---|---|---|---|
| 5,493,510 | A | 2/1996 | Shikata |
| 5,528,508 | A | 6/1996 | Russell et al. |
| 5,559,718 | A | 9/1996 | Baisuck et al. |
| 5,581,475 | A | 12/1996 | Majors |
| 6,009,251 | A | 12/1999 | Ho et al. |
| 6,011,911 | A | 1/2000 | Ho et al. |
| 6,035,113 | A | 3/2000 | Gerber et al. |
| 6,047,116 | A | 4/2000 | Murakami et al. |
| 6,275,971 | B1 | 8/2001 | Levy |
| 6,289,412 | B1 * | 9/2001 | Yuan .................. G06F 17/5022 703/14 |
| 6,363,516 | B1 | 3/2002 | Cano et al. |
| 6,543,039 | B1 | 4/2003 | Watanabe |
| 6,629,304 | B1 | 9/2003 | Gasanov et al. |
| 6,730,463 | B2 | 5/2004 | Heissmeier et al. |
| 6,845,494 | B2 | 1/2005 | Burks et al. |
| 6,886,148 | B2 | 4/2005 | Solomon |
| 6,969,837 | B2 | 11/2005 | Ye |
| 7,103,863 | B2 | 9/2006 | Riepe et al. |
| 7,146,583 | B1 | 12/2006 | Sun et al. |
| 7,149,989 | B2 | 12/2006 | Lakshmanan |
| 7,155,440 | B1 | 12/2006 | Kronmiller et al. |
| 7,415,694 | B2 | 8/2008 | Mayhew |
| 7,418,693 | B1 | 8/2008 | Gennari et al. |
| 7,461,359 | B1 | 12/2008 | Nequist |
| 7,847,937 | B1 | 12/2010 | Bevis |
| 7,873,204 | B2 | 1/2011 | Wihl et al. |
| 7,873,585 | B2 | 1/2011 | Izikson |
| 7,984,395 | B2 | 7/2011 | Cork |
| 8,019,561 | B1 | 9/2011 | Sahrling |
| 8,453,091 | B1 * | 5/2013 | Rao .................. G06F 17/5031 716/118 |
| 8,539,416 | B1 | 9/2013 | Rossman et al. |
| 8,799,833 | B2 * | 8/2014 | Wann .................. G06F 17/5068 430/30 |
| 9,405,879 | B2 | 8/2016 | Wang et al. |
| 9,454,635 | B2 | 9/2016 | Oberai |
| 9,740,811 | B2 * | 8/2017 | Chen .................. G06F 17/5072 |
| 9,916,411 | B2 * | 3/2018 | Nifong ................ G06F 17/5072 |
| 2002/0046392 | A1 | 4/2002 | Ludwig et al. |
| 2003/0163795 | A1 | 8/2003 | Morgan et al. |
| 2003/0229882 | A1 | 12/2003 | Ludwig et al. |
| 2005/0076316 | A1 | 4/2005 | Pierrat et al. |
| 2005/0183053 | A1 | 8/2005 | Ishizuka |
| 2005/0235245 | A1 | 10/2005 | Kotani et al. |
| 2006/0136856 | A1 | 6/2006 | Tang et al. |
| 2008/0046849 | A1 * | 2/2008 | Choi .................. G06F 17/5068 716/53 |
| 2008/0127016 | A1 | 5/2008 | Ishikawa |
| 2008/0155485 | A1 | 6/2008 | Lin et al. |
| 2008/0244493 | A1 | 10/2008 | Finkler |
| 2009/0089720 | A1 | 4/2009 | Nequist |
| 2009/0210845 | A1 | 8/2009 | Malgioglio et al. |
| 2009/0216450 | A1 | 8/2009 | Sakamoto et al. |
| 2009/0287440 | A1 | 11/2009 | Kulkarni |
| 2009/0310870 | A1 | 12/2009 | Monkowski |
| 2010/0238433 | A1 | 9/2010 | Lange et al. |
| 2010/0251202 | A1 | 9/2010 | Pierrat |
| 2011/0084312 | A1 | 4/2011 | Quandt et al. |
| 2014/0215422 | A1 | 7/2014 | Juneja et al. |
| 2015/0089457 | A1 | 3/2015 | Agarwal et al. |
| 2015/0339426 | A1 | 11/2015 | Nifong et al. |
| 2015/0339431 | A1 | 11/2015 | Chen et al. |
| 2015/0339432 | A1 | 11/2015 | Nance et al. |
| 2015/0339433 | A1 | 11/2015 | Nifong et al. |
| 2015/0339434 | A1 | 11/2015 | Nifong et al. |

OTHER PUBLICATIONS

U.S. Appl. No. 14/604,694, Non-Final Office Action dated Nov. 19, 2015.
U.S. Appl. No. 14/604,694, Notice of Allowance dated Jun. 2, 2016.
U.S. Appl. No. 14/673,064, Final Office Action dated Sep. 26, 2016.
U.S. Appl. No. 14/673,064, Non-Final Office Action dated Jun. 8, 2016.
U.S. Appl. No. 14/673,064, Notice of Allowance dated Mar. 8, 2017.
U.S. Appl. No. 14/673,064, Notice of Allowance dated Apr. 26, 2017.
U.S. Appl. No. 14/673,064, Notice of Allowance dated Nov. 14, 2016.
U.S. Appl. No. 14/673,709, Final Office Action dated Sep. 23, 2016.
U.S. Appl. No. 14/673,709, Non-Final Office Action dated Jun. 2, 2016.
U.S. Appl. No. 14/673,709, Notice of Allowance dated Mar. 2, 2017.
U.S. Appl. No. 14/673,709, Notice of Allowance dated Apr. 12, 2017.
U.S. Appl. No. 14/673,709, Notice of Allowance dated Nov. 8, 2016.
U.S. Appl. No. 14/713,488, Non-Final Office Action dated Mar. 2, 2017.
U.S. Appl. No. 14/713,716, Final Office Action dated Jan. 9, 2017.
U.S. Appl. No. 14/713,716, Non-Final Office Action dated Aug. 11, 2016.
U.S. Appl. No. 14/719,996, Non-Final Office Action dated Aug. 26, 2016.
U.S. Appl. No. 14/719,996, Notice of Allowance dated Mar. 15, 2017.
U.S. Appl. No. 14/719,996, Notice of Allowance dated Jun. 5, 2017.
U.S. Appl. No. 14/719,996, Notice of Allowance dated Nov. 16, 2016.
U.S. Appl. No. 14/713,488, Notice of Allowance dated Oct. 30, 2017.
U.S. Appl. No. 14/719,996, Notice of Allowance dated Sep. 22, 2017.
U.S. Appl. No. 14/713,716, Non-Final Office Action dated Aug. 10, 2017.
U.S. Appl. No. 14/713,716, Non-Final Office Action dated Apr. 13, 2018.
U.S. Appl. No. 15/654,511, Non-Final Office Action dated Apr. 10, 2018.
U.S. Appl. No. 15/654,565, Non-Final Office Action dated Apr. 23, 2018.
U.S. Appl. No. 14/713,716, Non-Final Office Action dated Nov. 2, 2018.
U.S. Appl. No. 15/654,511, Notice of Allowance dated Jan. 23, 2019.
U.S. Appl. No. 15/654,565, Notice of Allowance dated Jan. 17, 2019.

* cited by examiner

VIRTUAL HIERARCHICAL LAYER USAGE

RELATED APPLICATIONS

This application claims the benefit of U.S. provisional patent applications "Virtual Hierarchical Layer Usage" Ser. No. 62/002,808, filed May 24, 2014, "Virtual Hierarchical Layer Patterning" Ser. No. 62/006,069, filed May 31, 2014, "Virtual Cell Model Geometry Compression" Ser. No. 62/006,657, filed Jun. 2, 2014, "Negative Plane Usage with a Virtual Hierarchical Layer" Ser. No. 62/006,083, filed May 31, 2014, "Virtual Cell Model Usage" Ser. No. 62/006,607, filed Jun. 2, 2014, and "Virtual Hierarchical Layer Propagation" Ser. No. 62/006,092, filed May 31, 2014. The foregoing applications are each hereby incorporated by reference in its entirety.

FIELD OF ART

This application relates generally to semiconductor circuit design and more particularly to physical verification of semiconductor designs using Design Rule Checking (DRC).

BACKGROUND

The physical verification process for an integrated circuit (IC) is a design step taken by semiconductor manufacturers before commencing the fabrication of an IC. Semiconductor foundries define a set of design rules for manufacturing (DRM) for IC designers to follow in order to ensure successful manufacture and high yield of a design during the fabrication process. The DRM are defined as a set of geometric relationships between manufacturing layers, layers which in turn are used to create an IC. A physical design layout can include hundreds of layers used during the fabrication process to create transistors and electrical interconnect in the IC. The semiconductor process has grown in complexity and a physical design layout has to adhere to thousands of design rules before a design can be successfully fabricated. Use of a design rule checking (DRC) physical verification tool is an industry standard process for implementing the semiconductor's DRM.

The DRM can define many different parameters, such as width, spacing, angle, enclosure, density and electrical connectivity rules for design layers, which in turn are translated into a DRC runset. A DRC runset is defined as set of DRC operations that verify the required DRM rules. A DRC tool provides a set of operations, or commands, which a designer uses to build a sequence of DRC commands to satisfy each DRM rule. DRM rules commonly result in a DRC runset with 20,000 or more DRC commands for technology nodes smaller than 28 nanometers (nm). Modern DRC physical verification tools have a large suite of geometric and electrical commands to effectively implement the complex DRM rules. Many of these geometric and electrical commands result in the implementation of a unique algorithm that is not shared between individual commands, thus resulting in a very complex DRC tool with many algorithms.

Large ICs are typically built using a hierarchical method that begins with the creation of small child cells which are combined into larger parent cells, which then are successively used to build larger and larger cells to create an IC hierarchical design. Physical verification tools take advantage of the hierarchy in a design to efficiently process today's extremely large designs. Various forms of flattening processes are an alternative to hierarchical processing, but those flattening processes can result in very large increases in processing time and are often not feasible for design verification.

SUMMARY

A fast memory efficient hierarchical verification algorithm uses a hierarchical geometric shape that is referred to as a virtual hierarchical layer (VHL). The VHL has the property of encompassing the global hierarchical information of an entire IC design layer in a cell, which eliminates the need for traversing up and down hierarchy.

A computer-implemented method for design analysis is disclosed comprising: identifying a cell design within a semiconductor design layout that includes a plurality of layers and a plurality of hierarchical levels; determining an instance of the cell design and shapes which traverse the instance; generating a virtual layer corresponding to one of the plurality of layers within the semiconductor design layout which includes one or more of the shapes which traverse the instance; and augmenting the virtual layer with information on other shapes which traverse other instances of the cell design within the semiconductor design layout. The method can include repeating the identifying, determining, generating, and augmenting for a second virtual layer corresponding to a second layer from the plurality of layers. The method can further include performing a combination of the virtual layer and the second virtual layer.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Configuration Overview

Figure 1:
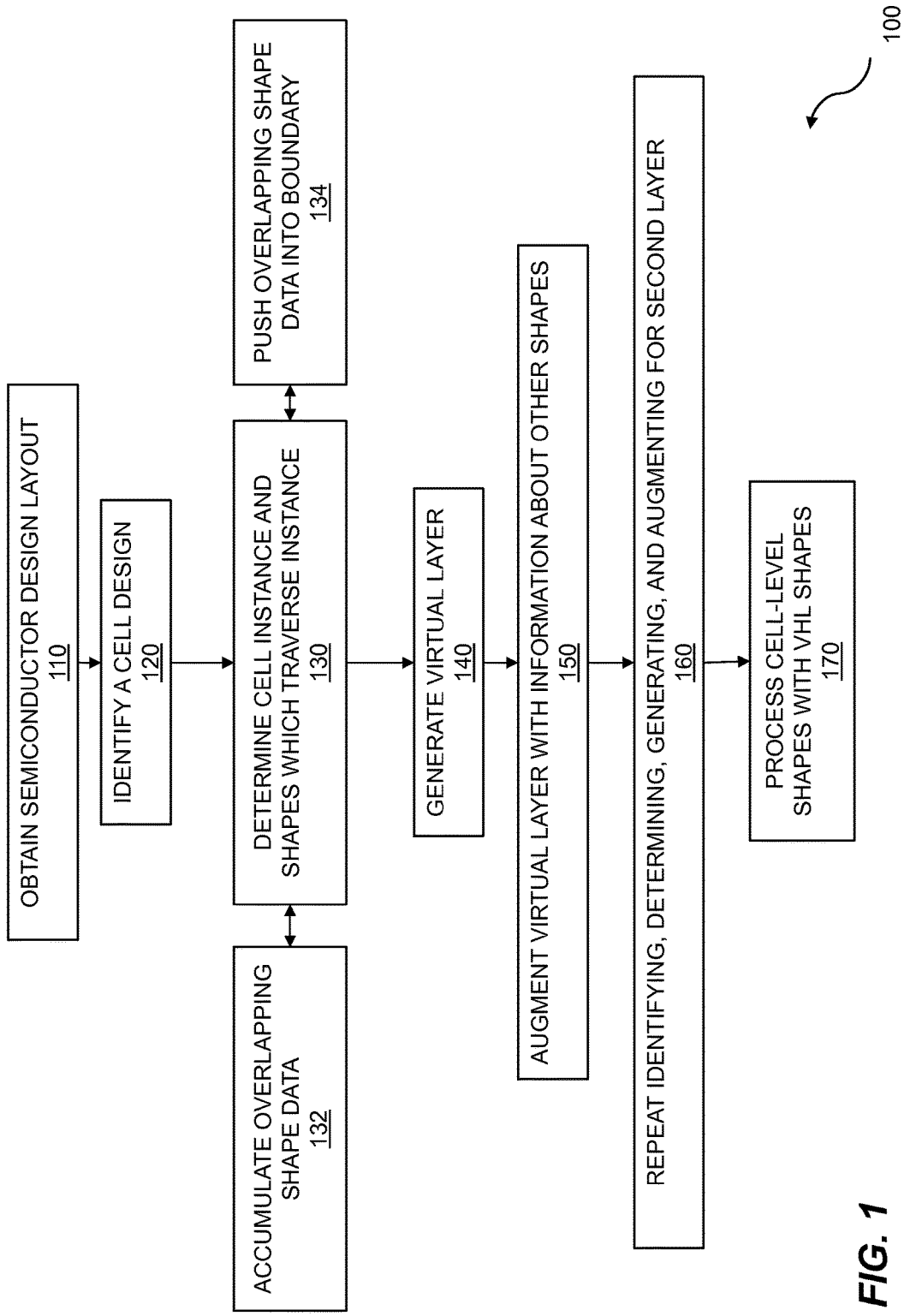
FIG. 1 is a flow diagram for virtual hierarchical layer usage.

Hierarchical physical verification of an integrated circuit (IC) is a complex process due to a multitude of hierarchical design styles that are created by IC design companies and other IC industry tools. The different design styles often result in extremely complex designs many levels deep and containing billions of cells and polygons overlapping each other throughout the hierarchy. In many verification methods, a hierarchical verification tool collapses the inefficient cell hierarchies and merges duplicate polygons to build a new hierarchy for the tool's individual command algorithms. Once the hierarchical tool builds its new hierarchy, then the layers stored at various levels of the newly-built hierarchy are processed in relation to each other based on the definition of the design rules and the unique geometric algorithms needed to implement them. For example, a design rules for manufacturing (DRM) rule for a certain IC can require verification to be performed by executing a sequence of commands (algorithms) in a design rule checking (DRC) runset, with each algorithm in the sequence cycling through proximal layers in the hierarchy to produce a hierarchical result which then feeds subsequent commands until the DRM rule is satisfied. An algorithm can have many optimizations which have been designed to avoid flattening the algorithm's result (output layer). Without these algorithmic optimizations, hierarchical data flattening causes the DRC algorithms to lose flexibility in processing by forcing cell data into ever larger chunks and creating extra processing time for the current algorithm and subsequent algorithms in the DRM rule.

Some hierarchical DRC methods are dependent on having the majority of the IC design layers loaded in memory before beginning the hierarchical algorithmic cycles that perform geometric operations on design data throughout the hierarchy. A hierarchical DRC method that loads an entire design layer has the advantage of having all of the instantiated cell data available in machine memory while cycling the geometric shapes throughout the hierarchy, which can result in reduced algorithm complexity. The implementation of such a hierarchical algorithm involves cycling design layers through the hierarchy searching for algorithmic interactions of geometric shapes. The hierarchical cycling is typically performed as either single-layer cycling, dual-layer cycling, or for some complex algorithms, N-layer cycling. As the layer count increases for a hierarchical algorithm, so does the memory requirement, which becomes problematic for larger and larger designs. In fact, given the exploding size of modern IC designs, loading an entire design layer requires more memory than is feasible.

In response to the massive memory requirement of loading an entire layer, several hierarchical DRC methods load only partial layers into memory, which reduces memory requirements for the hierarchical algorithms but increases algorithmic complexity and data loading time. For example, data loading time increases if all the layer data of a cell is not able to be kept in memory and the data must be reloaded every time one of the cell's multiple instantiations interacts with a hierarchical geometric shape being examined. Additionally, reloading the interacting data many times becomes a significant CPU performance issue. For example, if cell A is instantiated multiple times in a hierarchical design, and cell A's data has not been pre-loaded into memory, then every time a hierarchical layer's polygon is cycled through the hierarchy and interacts with an instantiation of cell A, cell A's data would have to be reloaded dynamically from disk, resulting in significant CPU I/O. As the alternative method of loading the entire design layer into machine memory has already been mentioned as infeasible given the increasing complexity and decreasing node size of modern semiconductor designs, virtual hierarchical layers are herein presented as an alternative. Virtual hierarchical layers eliminate dynamic cell reloading, eliminate the need to load an entire IC design layer into memory, and provide a mechanism for cell-level, bottom-up algorithms for processing hierarchical layers.

Current hierarchical DRC methodologies typically exhibit a performance tradeoff between memory consumption and dynamic data load time. The Virtual Hierarchical Layer (VHL) processes defined herein provide a method to reduce both memory and data load time by providing a bottom up cell-level processing technique Embodiments of the VHL create a hierarchical geometric layer for the purpose of performing an efficient hierarchical DRC process for verification of an IC design before the design proceeds to a fabrication stage in one of many possible semiconductor manufacturing processes. In one embodiment, the hierarchical geometric layers in an IC design are used to generate the VHL for a current cell from a combination of rectangles, trapezoids, and other shapes that reside in the hierarchy above the cell, as well as from geometric shapes in non-descendant sibling cells that interact with the cell.

The hierarchical information is collected by finding any geometric shape not contained by the cell (i.e., not in the current cell or in any of its descendants) that is overlapping any hierarchical placement of the current cell. The obtained hierarchical information is then used to compute the VHL. To gather the necessary geometric information regarding overlaps, all cells in the hierarchy are processed against the current cell's boundary. A two-step procedure is used for the hierarchical information propagation in some embodiments. First, it is determined whether or not the cell being processed can overlap with the current cell. Then, if there is a potential overlap, the geometric shapes in the cell are checked, and the shapes overlapping the current cell's boundary are collected. This two-step procedure falls into one of four cases, according to a hierarchical cell's relationship with the current cell:

1) If the cell being processed is the direct ancestor of the current cell, the cell can contain geometric shapes that overlap with one or more placements of the current cell. Therefore, the shapes of the direct ancestor cell being processed which overlap with the current cell are collected for the VHL generation.

2) If the cell being processed is a direct sibling of the current cell, one or more of the placements of the cell being processed can overlap with one or more placements of the current cell. In this case, the sibling cell being processed can still contain geometric shapes that overlap with the current cell, so the shapes of the direct sibling cell being processed are collected for the VHL generation. Some embodiments can check to see if the cell boundaries overlap before processing the geometric shapes of the sibling cells.

3) If the cell being processed is an indirect sibling of the current cell, the indirect sibling cell, by definition, shares one or more common ancestor cells with the current cell in the hierarchy. As with a direct sibling cell, common ancestor cells can be used to determine whether the cell being processed has placements that overlap with any of the current cell's placements. If any overlapping exists, the geometric shapes in indirect sibling cell that overlap with the current cell are collected for the VHL generation.

4) If the cell being processed is the direct descendant of the current cell, none of its data is collected for the VHL generation.

Once the hierarchical information has been collected, the VHL is calculated for the cell. Because the previous described procedures collect geometric shapes from other cells of the hierarchy which can have various placement orientations with respect to current cell, each collected shape is transformed to reflect its geometric position relative to the placement of the current cell when the overlap occurs. The process can require several different coordinate transformations. For example, when the geometric shape is from a direct sibling cell, both the coordinates of the shape and the current cell can be transformed to the parent cell's coordinates. After the coordinate transformation, the part of the shape that falls into the boundary of the cell is stored as a shape in the VHL. In this way, related shapes are merged and form the VHL, which in turn provides a snapshot of the hierarchical overlapping for the cell.

The embodiment described above generates VHL information for each cell only within its cell boundary. For example, if a geometric shape only abuts one placement of a cell, it will not show up in the VHL for the cell. Since it is important for some DRC algorithms to know the information surrounding the cell, another embodiment of the shape generation generates VHL shapes for an additional area surrounding the cell boundary. This second embodiment collects shapes in the same way as the previous embodiment, but instead of the original cell boundary, an oversized cell boundary (a virtual boundary) is used for the VHL calculation.

In such embodiments, the VHL is computed from collecting the hierarchical geometric shapes overlapping a cell's virtual boundary. In this case the VHL includes the accumulation of the data comprising the overlapping shapes that are pushed into a cell's virtual boundary and then merged into complex geometric shapes. The virtual boundary includes a cell's merged layer boundaries plus an additional cell margin referred to as an ambit. The ambit area is a ring-shaped area extended outside the original cell boundary created by extending the cell boundary by a small value known as the ambit value. Creating an ambit is also referred to as oversizing the cell. Hierarchical data that overlaps the oversized current cell is pushed into the virtual boundary, with the overlapping data pushed from parent cells and sibling cells into the current cell. Hierarchical data that does not overlap the current cell boundary but does overlap the ambit portion is also pushed into the virtual boundary. As a result, the geometric shapes overlapping the ambit extension area will be collected, and along with the shapes overlapping the cell's actual boundary will be computed into the complete VHL for the cell. In this way, hierarchical information on potentially interacting shapes for a cell is stored in the VHL, even if the shapes are slightly outside of the cell's boundaries.

Some embodiments also include an apparatus that executes VHL hierarchical algorithms as independent cell-level processes. A VHL allows the cell-level processes to accomplish more cell-level data processing in the cell without flattening data out of the cell. The cell-level data processing for each VHL algorithm eliminates the need for reloading data and limits memory consumption, since the entire layer hierarchy is not loaded into memory. In an additional embodiment, a single cell is processed, start to finish, by an instance of the VHL cell-level process, which allows for significant parallelization and multi-threading across all cells in an IC Design.

A DRC algorithm that uses a VHL takes in the pre-generated VHL shapes together with the input data layers and performs cell-level geometric operations. The creation of the VHL is a separate process that occurs before the DRC algorithms begin. Existing DRC tools acquire hierarchical information as the DRC algorithms are cycling on the hierarchical geometric shapes, thus the collected information in the VHL can be fed in to existing DRC tools. A VHL is independent from any particular DRC algorithm; one VHL is not limited to use by a specific DRC algorithm. Thus, if two DRC algorithms are performed on the same input data layers, they can share the same VHL. The sharing and reuse of the VHL also provides efficiency and flexibility for the implementation of DRC algorithms.

One of the uses of a VHL can be described in the context of an implementation of a hierarchical DRC command, because the VHL facilitates an efficient cell-level computation that allows the use of a single-pass, bottom-up algorithm. In comparison, current implementations of DRC tools traverse up and down the hierarchy in a less efficient manner in order to find data in other cells (ancestor, sibling or child cells) that overlaps with any placement of the current cell. An algorithm using the VHL can process all cells of the design from the bottom of the hierarchy to the top in one pass. When in each cell, the algorithm only needs to load the cell data and the associated VHL for the single cell one time each, which provides a significant reduction in the required computing resources as compared to the current method of traversing up and down through the hierarchical data looking for cell interactions. The algorithms that use the unique VHL to extract hierarchical information from the view inside a cell result in fast, cell-level geometric operations, memory reduction, reduced data flattening, and single-pass, bottom-up processing.

Although the command-dependent DRC algorithms can use the VHL shapes in different ways, there are at least three basic rules that can be applied for interpreting the VHL shapes of an input layer in a cell and that promote cell-level processing. First, the existence of VHL shapes indicates areas with uncertain hierarchical information. In areas with uncertain information, there can be shapes from a cell's ancestor or sibling cells that fall into the cell's area in one or more of its placements. The shapes of the cell in an area with VHL shapes can interact with the shapes of the cell's ancestors or siblings (i.e. in this embodiment the shapes stored in the VHL layer) in some of its instantiations, but not in others. Thus the results calculated based on the cell-level data might not be correct for all instantiations. The shapes of the cell in the VHL interactive areas need to be calculated on an individual basis to ensure that they are accurate for every instantiation. In such cases, the data related to the uncertain results can be passed up to the parent cell for further processing. Second, even when VHL shapes are interacting with cell-level data and creating uncertainty, many unique geometrical hierarchical attributes (e.g. enclosure) can be extracted from the VHL shapes and can allow an algorithm to compute the correct answer at the cell-level, which reduces data flattening. Third, the lack of VHL shapes in areas indicates accurate hierarchical information has been captured and that no shapes from ancestors or siblings of a given cell would fall into the area of the cell in any of its instantiations. The lack of VHL shapes also indicates that data in the area under consideration can be resolved within the cell. If there is cell-level data in the area lacking VHL shapes, then it can be inferred that the cell-level data will not be changed as a result of hierarchical interactions and therefore results can be computed at the cell-level and written out in the current cell.

The above rules can also be used by commands processing more than one layer. When performing DRC operations on multiple data layers, the DRC commands usually require the providing of geometric relations among the input layers. The VHL input to a command provides the necessary hierarchical information required by the algorithm. For example, a command algorithm can tell if it is possible for a geometric shape from one layer to interact or not interact with another layer by combining the current data from the two layers with the VHL shapes from the two layers. If the current data or VHL shapes from the first input layer are not interacting with the data or VHL shapes from the second layer, the algorithm can determine that there is no interaction between any placements of this cell and the second layer. Conversely, if the current data from the first input layer interacts with the second layer's VHL shapes, then the two layers can interact across one or more placements of the cell.

As previously mentioned, knowing the geometric landscape outside the set boundaries of a cell can prove helpful. To this end, the ambit, or virtual boundary, of a cell can be examined to determine additional information on shapes. For example, a command measuring the length of the edge can read from the VHL ambit to tell if the edges can extend outside the cell boundary. If the edges touch the cell boundary but not the VHL ambit, then the command algorithm can still determine that the edge is not extended out of the cell without accessing data outside the cell. On the other hand, if the edges touch the cell boundary and continue into the VHL ambit, they can be determined to extend out of the cell. The edges might still not be complete, as they might extend further outside of the ambit area, so their length measured in the cell might not be accurate. In this case, more information is required to calculate the accurate length. In such cases, a warning may be generated, and/or an additional computation may be made using additional information to derive an accurate length.

In embodiments, using the VHL allows physical verification algorithms to process the IC design layers using fast cell-level computation, and single-pass bottom-up processing where data is loaded once, resulting in reduced data flattening and reduced memory consumption. In some embodiments, each VHL algorithm can accomplish single-cell algorithm execution start to finish, which promotes significant parallelization and multi-threading across all cells in an IC Design.

Further Details

FIG. 1 is a flow diagram for virtual hierarchical layer usage. The flow 100 can include obtaining a semiconductor design layout 110 including a plurality of layers and a plurality of hierarchical levels. The semiconductor design layout can be in various formats and can have any number of hierarchical levels describing any number of layers of a mask set for an IC. The layers can represent mask layers, fabrication layers, logical layers, design layers, and so on. The hierarchical levels can include architectural levels, design levels, logical levels, physical levels, etc. The hierarchies can include small cells which can be combined into larger cells, larger cells that can be combined into sub-modules, sub-modules that can be combined into modules, modules that can be combined into systems, and so on. The semiconductor design layout can be obtained from a library of design layouts stored in a computer-readable format. The layout can be obtained by reading one or more computer files from one or more storage media, by being stored in computer memory and retrieved, by using a logical design to generate a physical semiconductor design layout, by receiving design data entered by a user, by receiving wired or wireless communication by scanning layout images, and so on.

The hierarchy can include one cell, which can be referred to as a parent cell and which includes an instantiation of another cell, which can be referred to as a child cell of the parent cell. The hierarchy can include parent cells with multiple child cells. In this case, child cells of a common parent cell can be called direct sibling cells. In some cases, the parent cell can include multiple instantiations of the same child cell. In some cases, a child cell can include one or more child cells of its own. There can be any number of generations included in a single parent cell. One cell is a direct descendant of another cell if a path from the descendant cell up through the hierarchy to the ancestor cell can be traced without going back down in the hierarchy. If two cells share at least one common ancestor cell, but are not direct siblings, they can be called indirect sibling cells. If a cell includes no child cells, it can be referred to as a leaf cell. Some of the layers of the cells can represent physical features of the IC, such as metallization layers, polysilicon layers, or implantation areas. Other layers can represent physical features that are temporarily created during the fabrication of the IC, such as sacrificial layers. Still other layers can represent details used during the fabrication of the IC but with no physical manifestation, such as alignment features.

The flow 100 includes identifying a cell design 120 within the semiconductor design layout that includes a plurality of layers and a plurality of hierarchical levels. The identified cell design can be a logical cell, a design cell, a layout cell, a physical cell, etc. The identified cell can be part of a larger parent or ancestor cell and can, in turn, include smaller descendent cells. There can be one or more instances of the cell, where the instances can be direct siblings or indirect siblings. The cell can be identified for any of a variety of purposes including logical verification, design verification, circuit simulation, logic simulation, desire rule checking (DRC), design rules for manufacturing (DRM) verification and so on. The cell design can be at any level of the hierarchy, but in at least one embodiment, the identified cell design is at the lowest hierarchical level and does not have child cells of its own. In some embodiments, the flow 100 is repeated for multiple cell designs within the semiconductor design layout.

The flow 100 includes determining an instance of a cell design and shapes which traverse the instance 130. The instance can be determined by any method including tree traversal and various graph traversal techniques. In at least one embodiment, the determining the instance can be accomplished by searching through a physical hierarchy of the semiconductor design layout. In some embodiments, the physical hierarchy can be analyzed based on a logical hierarchy of a design based on the semiconductor design layout. Depending on the embodiment, the determined instance can be the first discovered instance of the identified cell design, the instance at the highest level of the hierarchy, or any other criteria for determining the particular instance. The instance of a cell can be determined for a variety of purposes including circuit analysis, logical analysis, system analysis, system verification, and so on. The instance of a cell can be determined based on the cell's location within the logical, design, circuit, or architectural hierarchical level, or any other appropriate level.

Once the instance has been identified, the shapes which traverse the determined instance are also determined. The shapes can include rectangles, polygons, and other shapes appropriate to the design. The shapes which traverse the instance can be defined as any geometric shape in a layer of interest, not contained in the instance of the cell in question or any of the cell's descendants, that overlaps the instance. The traversing shapes can be included in levels throughout the hierarchy or hierarchies described above. The shapes can share a hierarchical level with the determined cell or can be on another hierarchical level or levels. In some embodiments, one layer at a time is examined for the overlapping shapes, but in other embodiments, multiple layers can be simultaneously examined for overlapping shapes. To find the traversing geometric shapes, other cells in the semiconductor design layout are compared to the boundary of the determined instance of the identified cell design to determine if there is a potential overlap between the two cells. If a potential overlap exists between the determined instance and another cell, then further processing can determine whether there are shapes in the other cell that traverse the instance. The further processing of overlapping cells depends upon the hierarchical relationship between the two cells in some embodiments.

For example, if the potentially overlapping cell is an ancestor cell, a direct sibling cell or an indirect sibling cell of the determined instance, the ancestor cell is examined to find geometric shapes that traverse the determined instance. The traversing shapes are pushed into the boundary of the determined instance. The traversing shapes are collected, or accumulated, for inclusion in a VHL. Thus, the flow 100 can further comprise accumulating overlapping shape data 132. If the other cell is a descendant of the determined instance, the other cell is not processed to find geometric shapes that traverse the determined instance.

The flow 100 can also further comprise pushing overlapping shape data into the boundary 134 on a cell instance in order to determine potential interactions between the instance of the cell and the pushed shapes. In some embodiments, the boundary of the determined cell instance is expanded by an ambit (as discussed earlier, a certain extension of the cell's borders) before determining if other cells overlap with the determined instance. The oversizing of the cell allows shapes that do not fall inside the original cell boundary to be included in the VHL, providing the possibility of analyzing shapes which could potentially fall close enough to the cell instance's boundary to affect shapes within the boundary, but are not contained within the cell instance's original boundary.

The flow 100 continues by generating a virtual layer 140 corresponding to one of the plurality of layers within the semiconductor design layout which includes one or more of the shapes which traverse the cell instance. The VHL can have any form, including a graphical form or a textual form, but in some embodiments the VHL is stored as a digital file on a computer-readable medium that includes digital descriptions of the various shapes included in the VHL. The geometric shapes that were collected for inclusion in the VHL because they both traverse the determined instance and are from the layer of interest for the VHL, are used to generate the VHL. The VHL can include one or more rectangles, polygons, and so on. In some embodiments, the VHL includes data from a single layer of the semiconductor design layout, while in other embodiments, the VHL can include data from multiple layers. More than one VHL can be generated for a layer within the semiconductor design. Because a child cell can be instantiated in any orientation within a parent cell, the various geometric shapes which are collected for inclusion in the VHL are first transformed into a common coordinate system. A child cell can be mirrored for a variety of purposes including I/O connectivity, layout convenience, layout efficiency, and so on. A child cell can be rotated by any amount supported by the cell's particular design style, or to accomplish a variety of goals including layout convenience, layout efficiency, signal connectivity, and so on. In some embodiments, the common coordinate system is the same as the coordinate system of the determined cell instance, although other embodiments use different coordinate systems for locating and guiding the transformation of the collected cells. The transformation can include one or more of linear translation, rotation, scaling, or mirroring.

Some of the collected geometric shapes might fall completely within the boundaries of the determined cell instance and therefore be included in the VHL in their entirety. However, some of the collected geometric shapes might only partially lie within the boundaries. For such shapes, an overlapping area of the portion of the geometric shape that falls within the boundary of the determined cell instance (which can include the ambit area in some embodiments) is included in the VHL. The part of the geometric shape that falls outside of the boundary of the determined cell instance is generally not included in the VHL. Thus the VHL can include geometric shapes for the layer of interest of other cells that traverse the determined instance of the identified cell design of the semiconductor design layout.

The virtual layer can include information from any level of the logical hierarchy or the physical hierarchy of the semiconductor design layout. The process of collecting the geometric shapes that traverse the cell instance from other levels of the hierarchy and combining them into a virtual layer has the effect of reducing the amount of data that needs be stored for the cell instance to describe its interaction with other levels of the hierarchy. Thus, the virtual layer includes compressed hierarchical data.

The cell boundary can be defined as a physical layer boundary, a logic level boundary, a design level boundary, and so on. In some embodiments, the virtual layer can include information on the edges of the cell design that are near the cell boundary. The edges of the cell can include polygons, signal paths, I/O connections, and so on. One way of providing information on the edges of a cell design is to define an ambit value and extend the boundary of the cell by the ambit value to create an ambit area surrounding the cell. Shapes that overlap the ambit area can be included in the VHL for the ambit area to include information on edges of the cell design.

The flow 100 includes augmenting the virtual layer with information on other shapes 150 which traverse other instances of the cell design within the semiconductor design layout. The other cell instances can be based on the same cell, on sibling cells, and so on. The other instances can be physical instances, logical instances, design instances, and so on. The searching described above to determine the cell instance can further comprise determining the other instances. The other instances of the identified cell design can be found and processed in a similar fashion to that described above for the determined cell instance in order to find other geometric shapes for the layer of interest from other cells that traverse the other instances of the identified cell design. In some embodiments, the layer of interest is the same as the layer corresponding to the virtual layer, so the other shapes can be based on the one or more of the plurality of layers. In some embodiments, the layer of interest is different from the layer corresponding to the virtual layer, so the other shapes can be based on a different layer than the one of the plurality of layers.

In some embodiments, a separate VHL is created for the other instances of the identified cell design which can later be combined with the VHL of the originally determined cell instance, thereby augmenting the original VHL. Additionally, the other shapes found to overlap the other instances can be directly added to the VHL initially created for the determined cell instance, also augmenting the VHL. In some embodiments, a virtual layer, which is formed from a union of shapes from the cell instance and the other instances of the cell, is generated for analysis. The augmenting can also include providing additional information in the virtual layer. Depending on the embodiment, the augmenting can include one or more of modifying a shape in the virtual layer, describing a distance to a neighboring shape, or describing a layout level of concern.

The VHL can be augmented for simulation and validation purposes. The simulating can include layout, design, and logical simulation, for example, and the validating can include system validation and the like. The augmenting can include forming rectangles, polygons, and complex polygons.

The flow 100 can further comprise repeating the identifying, determining, generating, and augmenting for a second virtual layer 160 corresponding to a second layer from the plurality of layers. In some embodiments, the identifying can identify the same cell design as before and perform the determining, generating and augmenting for the additional layer to create a second VHL for the same cell but corresponding to a different layer. The process is repeated, in at least one embodiment, until a VHL has been created for all the layers of the semiconductor design layout that will be evaluated with DRC. Then, the repeating can continue with identifying a different cell design and generating a VHL for the various layers for that cell design, and in at least some embodiments, repeating until all the cell designs that will be evaluated with DRC have a set of VHLs. The VHL can be generated for analysis and can be formed from a union of hierarchical data from parent and ancestor cells, and hierarchical data from direct and indirect sibling cells. The VHL can include data generated from hierarchical data that is overlapping instances of the cell. The VHL can be generated by combining the rectangles and the polygons into more complex polygons. The VHL can be used for a variety of purposes including circuit, logic, and system analysis; system verification; DRC; DRM; and so on.

The flow 100 in some embodiments includes processing cell-level shapes with the VHL shapes 170. Because the hierarchical information for potential interactions between hierarchical levels for one layer of the design layout is compressed into a VHL for a given cell instance, the cell-level shapes can be processed to check for interactions with the VHL for the cell instance without needing to repeatedly move up and down the hierarchy to check for interactions with each instantiation of the cell instance. If a shape in a layer of the cell instance does not interact with any of the shapes in the VHL for that layer, then it can be determined that the shape of the cell will not interact with other shapes in any instantiation of that cell at any level in the hierarchy. If the shape in the layer of the cell does interact with a shape in the VHL for that layer, then there is a possibility that the shape interacts with a shape from another cell in at least one instantiation of the cell. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
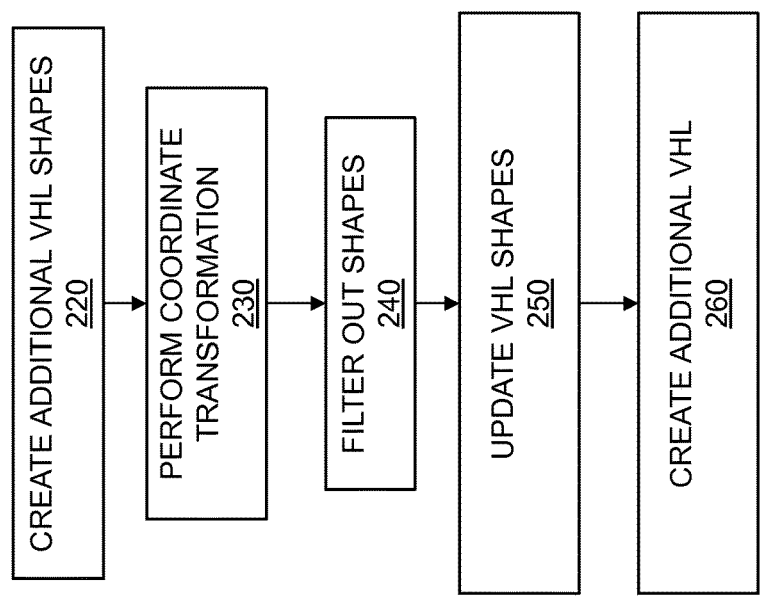
FIG. 2 is a flow diagram for added shape manipulation.

FIG. 2 is a flow diagram for added shape manipulation. The flow 200 describes, at least in part, some of the processing that can occur in some embodiments during the augmenting of the virtual layer with information about other shapes 150 from the flow 100. In this case, a VHL has already been created based on at least one determined instance of an identified cell of a semiconductor design layout before the actions described by the flow 200. The VHL includes shapes pushed from other layers of the hierarchy that overlap with the cell instance.

The flow 200 includes creating additional VHL shapes 220. The additional VHL shapes can be created based on other instances of the same identified cell. Shapes from cells that overlap with the other instances of the cell are identified as additional VHL shapes for further processing. In some embodiments, the additional VHL shapes are from the same layer as the original cell-level shapes in the VHL, but in other embodiments, the additional VHL shapes can be from one or more other layers instead of, or in addition to, the layer of the original cell-level shapes of the VHL. The additional shapes can be the same as the shape in the overlapping cell if the shape falls completely within the boundaries of the other cell instance, or can be a portion of the original shape if the shape in the overlapping cell only partially falls within the boundary of the other instance.

In some cases the other instances of the cell might not have the same frame of reference as the originally determined cell. Therefore, the flow 200 includes performing coordinate transformation 230 on the additional VHL shapes in some embodiments. The transformation can include one or more of linear translation, scaling, rotation, or mirroring. In some embodiments, both the shapes of the original VHL and the additional VHL shapes are transformed to a common reference that is different than the reference of either of the original VHL shapes or the additional VHL shapes.

The flow 200 includes filtering out shapes 240 in some embodiments. An additional shape might be completely subsumed in the already included shapes and thus able to be filtered out without impacting the accuracy of the final combined VHL. In other cases, the additional shapes might completely subsume a shape in the original VHL so that the shape of the original VHL can be filtered out without negative impacts. In some embodiments, certain shapes that meet some criteria, such as being smaller than a minimum size, are filtered out as well. Various embodiments can use other filtering criteria.

The flow 200 includes updating VHL shapes 250. The updated VHL shapes can be based on a combination of the original VHL shapes and the additional VHL shapes. In at least one embodiment, the updated VHL shapes are a result of the union of the original VHL shapes and the additional VHL shapes. In another embodiment, redundant shapes and/or other shapes are filtered out of the updated VHL shapes to reduce the size of the VHL. In embodiments, coordinate transformation is performed on one or more shapes to be used for updating the VHL shapes. Additionally, a further virtual layer can be created 260 based on the updated VHL shapes. So, because the updated VHL shapes can be a combination of the original VHL shapes and the additional VHL shapes, a further virtual layer can be created based on the combination.

Figure 3:
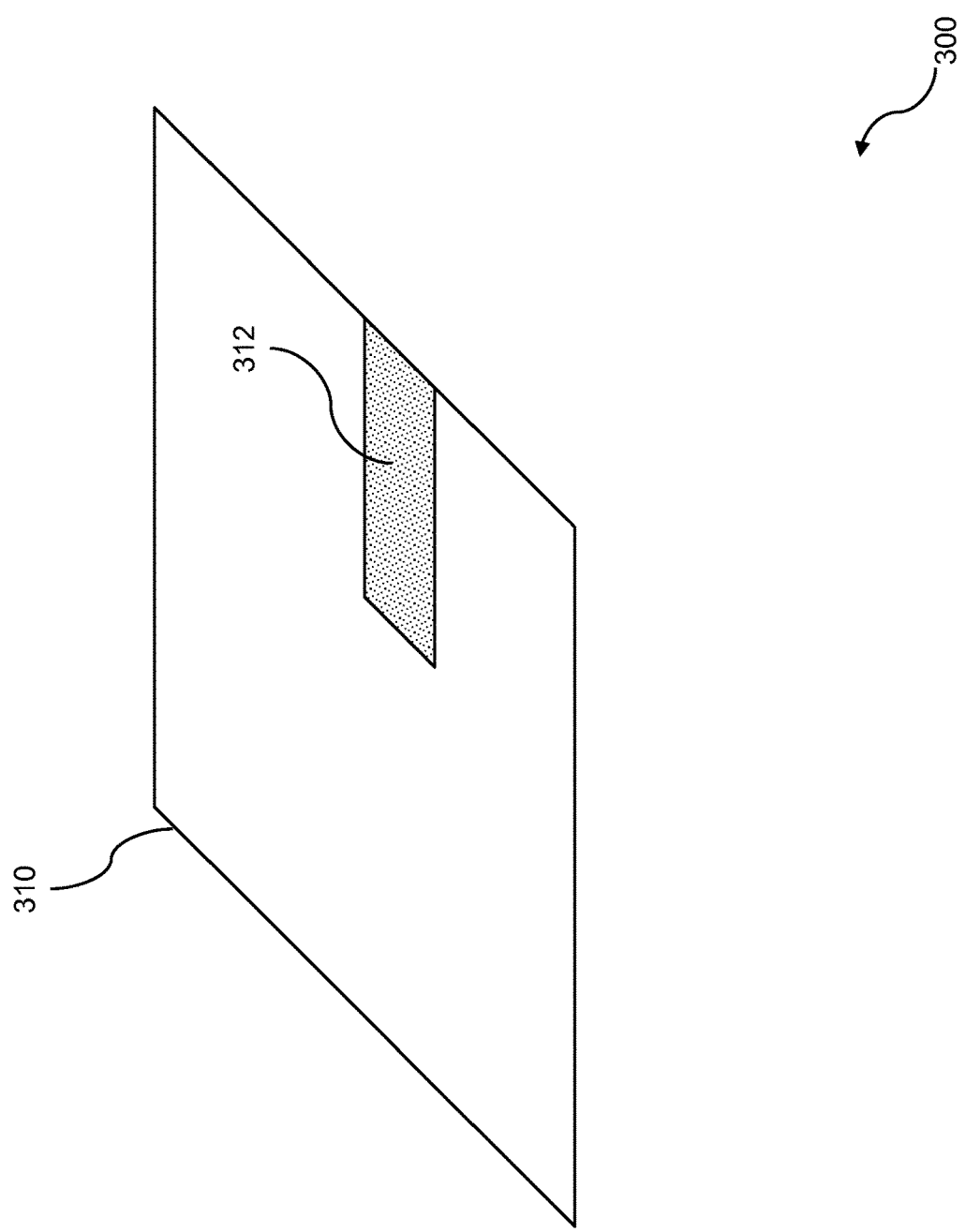
FIG. 3 shows example initial data of Cell A.

FIG. 3 shows example initial data of Cell A 300. Cell A 300 has a cell boundary 310 and includes one or more geometric shapes on one or more layers of the semiconductor design layout. One example of a geometric shape in Cell A 300 is a rectangle 312 on a particular layer of interest. Cell A 300 can be a cell in the virtual hierarchy or the physical hierarchy of the semiconductor design layout and can be instantiated one or more times in the semiconductor design layout at any level of the hierarchy. In this example, Cell A 300 is a leaf cell because it has no child cells. Cell A 300 can identified as a cell design within the design layout in the identifying of a cell design 120 step of the flow 100.

Figure 4:
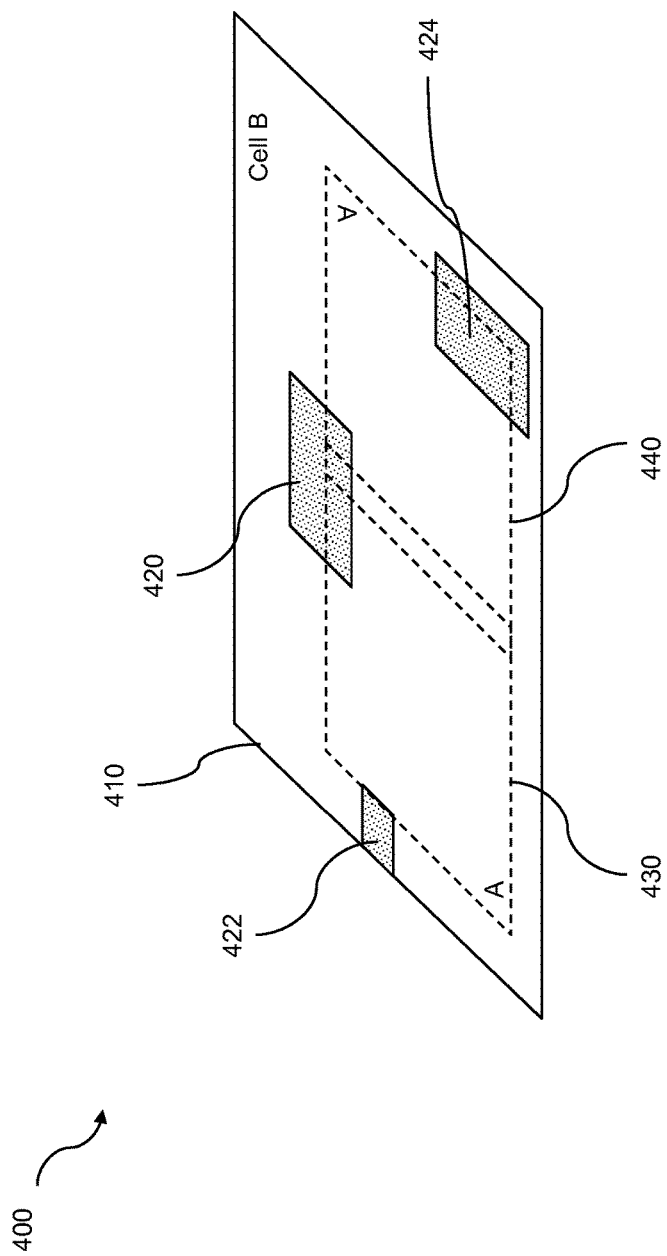
FIG. 4 shows example initial data of Cell B.

FIG. 4 shows example initial data of Cell B 400. Cell B 400 has a cell boundary 410 and includes one or more geometric shapes on one or more layers of the semiconductor design layout. Examples of geometric shapes in Cell B 400 include rectangle 420, rectangle 422, and rectangle 424. Each of the rectangles 420, 422, 424 are on a particular layer in Cell B 400. While a cell typically has shapes on more than one layer, for the purposes of this example the rectangles 420, 422, 424 are on the same layer as the rectangle 312 of Cell A 300. Cell B 400 can be a cell in the virtual hierarchy or the physical hierarchy of the semiconductor design layout and can be instantiated one or more times in the semiconductor design layout at any level of the hierarchy. Cell B 400 could also be identified as a cell design within the design layout in the identifying of a cell design 120 step of the flow 100.

Cell B 400 also includes two instantiations of Cell A 300. The first instantiation 430 is located at a first position in Cell B 400 with the same orientation as Cell B 400. The second instantiation 440 is located at a second position in Cell B 400 but is rotated 180 degrees with respect to the first instantiation 430 and Cell B 400. The rotation of the second instantiation 440 of Cell A 300 can also be performed by mirroring Cell A 300 across both the x and y axis, thus in some cases, the other instances of a cell can include a mirroring of the cell design. In FIG. 4, the first instantiation 430 of the cell overlaps with the second instantiation 440 of the cell. Both instantiations 430 and 440 overlap the rectangle 420. The first instantiation 430 of the cell butts up against the rectangle 422 but does not overlap it. The second instantiation 440 of the cell overlaps the rectangle 424.

Cell B 400 is the parent cell (and an ancestor cell) to both the first instantiation 430 and the second instantiation 440 of Cell A 300, which are in turn both child cells of Cell B 400. The first instantiation 430 and the second instantiation 440 are direct siblings of each other.

Figure 5:
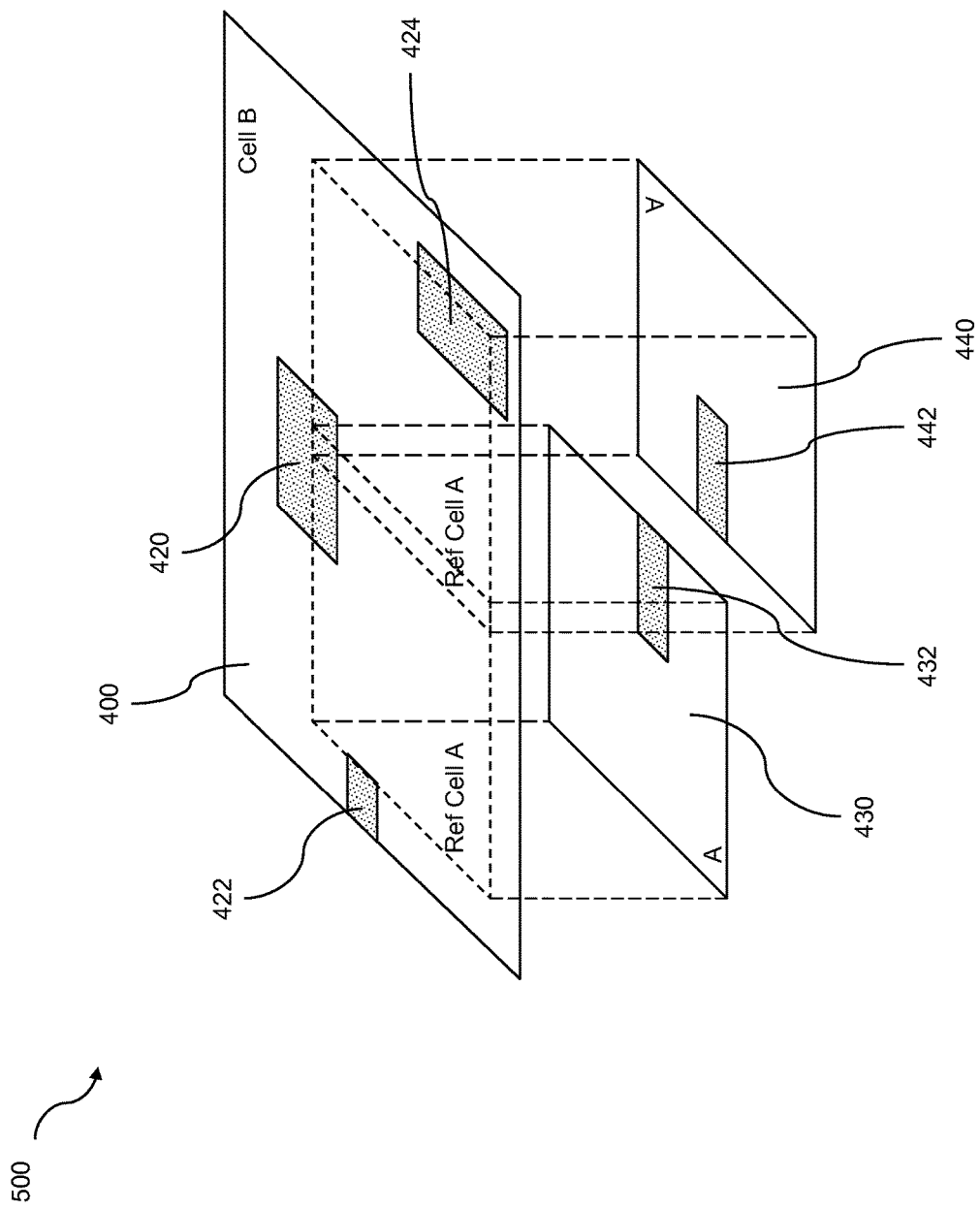
FIG. 5 shows an example hierarchical layout of Cell B with two instantiations of Cell A.

FIG. 5 shows an example hierarchical layout 500 of Cell B 400 with two instantiations of Cell A 300. Cell B 400 includes three rectangles, rectangle 420, rectangle 422, and rectangle 424, as well as a first instantiation 430 of Cell A 300 and a second instantiation 440 of Cell A 300 that is rotated 180 degrees. The first instantiation 430 of Cell A includes the rectangle 432 and the second instantiation 440 includes the rectangle 442. The two rectangles 432, 442 of the two instantiations 430 and 440 of Cell A 300 have the same relative position in the cell but the rectangle 442 is rotated 180 degrees in accord with the rotation of the second instantiation 440. The hierarchy shown is a physical hierarchy, but a virtual hierarchy could also exist for the layout 500.

Figure 6:
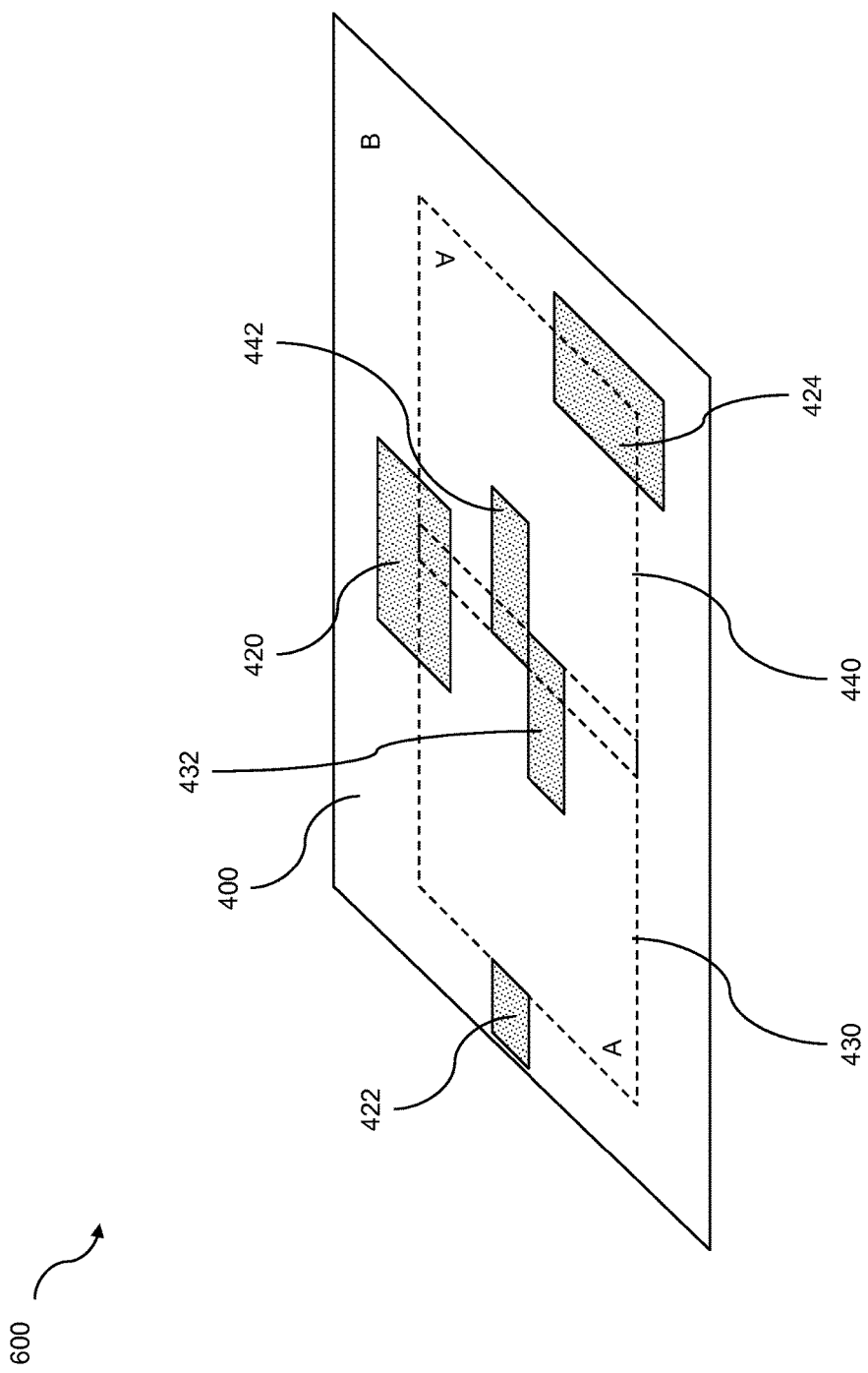
FIG. 6 shows an example top overview of a hierarchical layout.

FIG. 6 shows an example top overview of a hierarchical layout. The hierarchical layout 600 is simply a top view of the elements included in the hierarchical layout 500 of FIG. 5. The layout 600 includes Cell B 400 which includes three rectangles, rectangle 420, rectangle 422, and rectangle 424, as well as a rectangle 432 from a first instantiation 430 of Cell A 300 and a rectangle 442 from a second instantiation 440 of Cell A 300 that is rotated 180 degrees.

Figure 7:
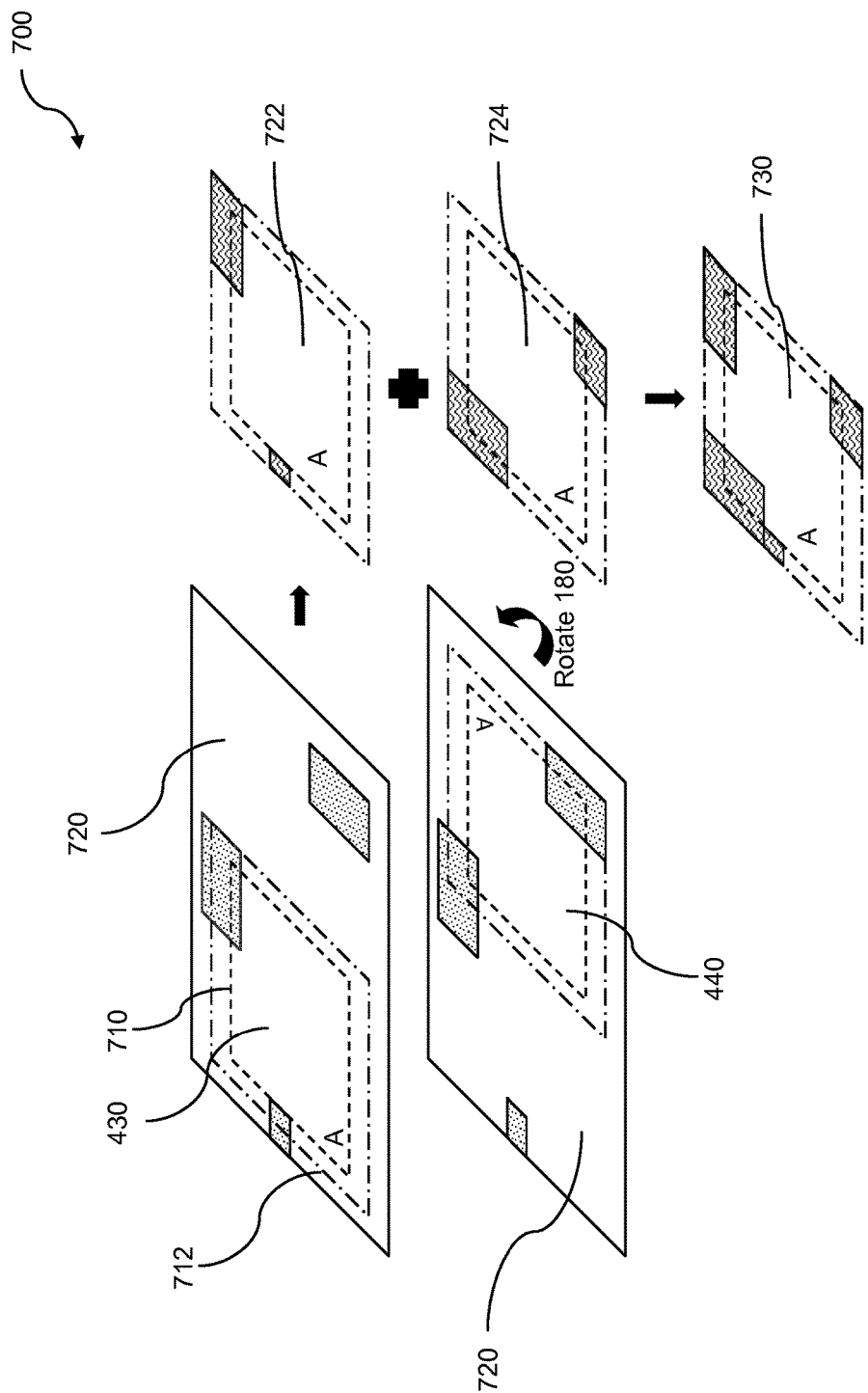
FIG. 7 shows example hierarchical overlapping information propagation and virtual layer computation from parent cell to child cell.

FIG. 7 shows example hierarchical overlapping information propagation and virtual layer computation from parent to child cell. The diagram 700 illustrates part of the process of an embodiment of the flow 100 of FIG. 1, including determining a cell instance and shapes which traverse the instance, generating a virtual layer, and augmenting the virtual layer with information about other shapes. The diagram 700 uses the hierarchical design 500 as shown in FIG. 5 for the example. The diagram 700 depicts looping through the entire hierarchy to process each cell discretely (Cell B and Cell A in this example) against the target Cell A to find overlapping geometric shapes and then merging those shapes to generate the VHL for Cell A.

A cell instance 430 is identified as an instance of the identified cell design, which in this example is Cell A 300. The boundary 710 of the cell instance 430 is moved by an ambit value to create an oversized cell boundary 712 that circumscribes the original cell boundary and includes an ambit area surrounding the original boundary 710 of the cell instance 430, and disposed between the original boundary 710 and the oversized cell boundary 712. The oversized cell boundary 712 is then used for further processing to determine shapes that overlap the cell instance.

Based on the hierarchy, it can be determined in the example given that the cell instance 430 has a parent cell, which is Cell B 400. The shapes that are included in Cell B 400 are shown as a partial cell 720, as the partial cell 720 does not include the instances of cell A 300 that are a part of Cell B 400. Because Cell B 400 is a parent to the cell instance 430, there is a chance that shapes of the partial cell 720 overlap with the cell instance 430. The shapes of the partial cell 720 are then individually checked to see if they overlap with the instance 430. In the example 700 shown, two rectangles of the partial cell 720 are found to overlap with the oversized boundary 712 of the instance 430 and the portions of the rectangles that overlap are pushed into the boundary of the region to form a virtual layer 722. Thus, the diagram 700 shows pushing the overlapping shape data into a boundary of the region.

Another instance of the identified Cell A 300 is determined to be the second instance 440. The second instance 440 of Cell A is a direct sibling of the first instance 430 of the same cell in this example, but the other examples can have cell instances which represent a direct sibling, an indirect sibling, an ancestor, or a descendant cell. The second cell instance 440 also has Cell B 400 as a parent, so it is also checked to see which, if any, of the shapes of the partial cell 720 overlap with the oversized boundary. In the example 700, two rectangles of the partial cell 720 are found to overlap with the oversized boundary of the cell instance 440 and the portions of those rectangles that overlap are pushed into the boundary of the region to form a second virtual layer 724. The overlapping rectangles in the second virtual layer 724 are transformed to remove the 180 degree rotation of the second instance 440. The transformation puts the second virtual layer 724 in the same frame of reference as the first virtual layer 722.

The first virtual layer 722 can then be augmented with the second virtual layer 724 to create an augmented virtual layer 730. The augmented virtual layer 730 has the union of the sets of the overlapping shapes from both the first virtual layer 722 and the second virtual layer 724. So, the diagram 700 can include augmenting the virtual layer with information on other shapes which traverse other instances of the cell design within the semiconductor design layout.

The diagram 700 illustrates performing a combination of the virtual layer 722 and the second virtual layer 724. The combination can be referred to as a virtual hierarchical layer (VHL). The combination can be used in analyzing the semiconductor design layout. In at least one embodiment, the analyzing includes design rule checking (DRC). The analyzing can be performed to identify weak spots in the semiconductor design layout. The weak spots are locations where typical variations in the manufacturing process can lead to manufacturing defects (e.g. such as in lithography/patterning). For example, during patterning, focus and exposure have to be within a certain window to provide an acceptable yield. The design rule checking may identify weak spots where lithography may be compromised. In some embodiments, the analyzing includes reporting the number of weak spots identified.

Figure 8:
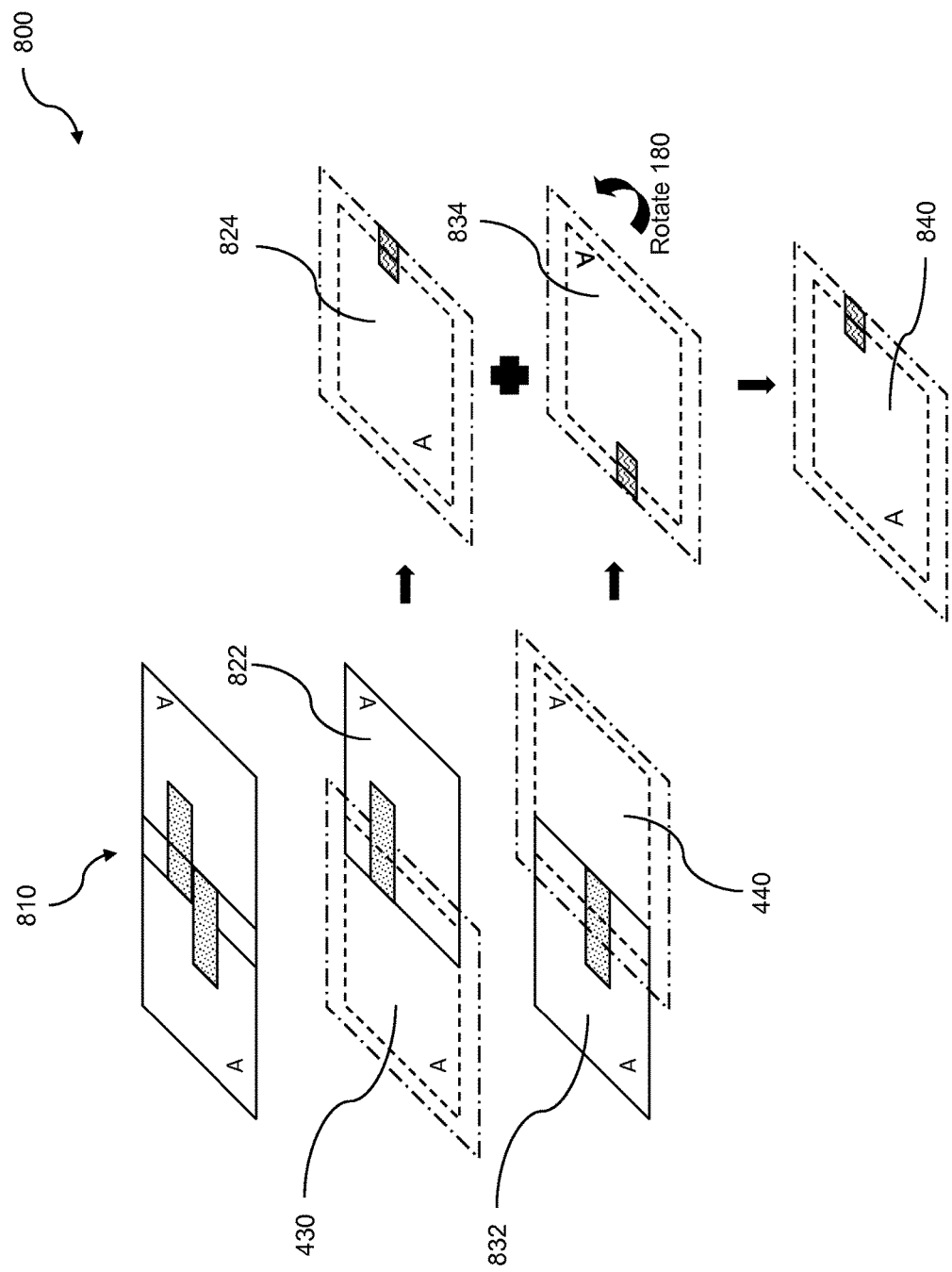
FIG. 8 shows example hierarchical overlapping information propagation and virtual layer computation from reference cell to reference cell.

FIG. 8 shows example hierarchical overlapping information propagation and virtual layer computation from reference cell to reference cell. The diagram 800 illustrates part of the process of another embodiment of the flow 100 of FIG. 1, including determining a cell instance and shapes which traverse the instance, generating a virtual layer, and augmenting the virtual layer with information about other shapes. The diagram 800 also uses the hierarchical design 500 as shown in FIG. 5 as an example. The diagram 800 shows the hierarchical overlapping information propagation and VHL computation from Cell A to another instance of the same cell.

A portion 810 of the hierarchical design 500 is extracted that contains the child cells of cell B 400. A cell instance 430 is identified as an instance of the identified cell design, which in this example is Cell A 300. The boundary of the cell instance 430 is resized by an ambit value to create an oversized cell boundary that includes an ambit area surrounding the original boundary of the cell instance 430. The oversized cell boundary is then used for further processing to determine shapes that overlap the cell instance.

In the original design layout 500, a second instance 440 of Cell A overlaps the first instance 430. In embodiments, the shapes of Cell A are extracted as a partial cell 822 and checked to see if they overlap with the first cell instance 430. A portion of the rectangle of the partial cell 822 overlaps with the first cell instance 430 in the example given, so a virtual layer 824 is created that includes the overlapping portion of the rectangle.

The second cell instance 440 can then be used to see what shapes from sibling cells might overlap it. The partial cell 832 representing shapes of the first cell instance 430 has a rectangle that overlaps the second instance 440, so a second virtual layer 834 can be created that includes the overlapping portion of the rectangle. The second virtual layer 834 is then rotated to put it in the same frame of reference as the first virtual layer 824 and the two virtual layers 824, 834 can be combined to create an augmented virtual layer 840. In this particular example, the shapes included in the two virtual layers 824 and 834 are identical, so the hierarchical information can be compressed by representing both overlapping rectangles with a single rectangle in the augmented virtual layer 840. So, the diagram 800 shows augmenting the virtual layer with information on other shapes which traverse other instances of the cell design within the semiconductor design layout.

Figure 9:
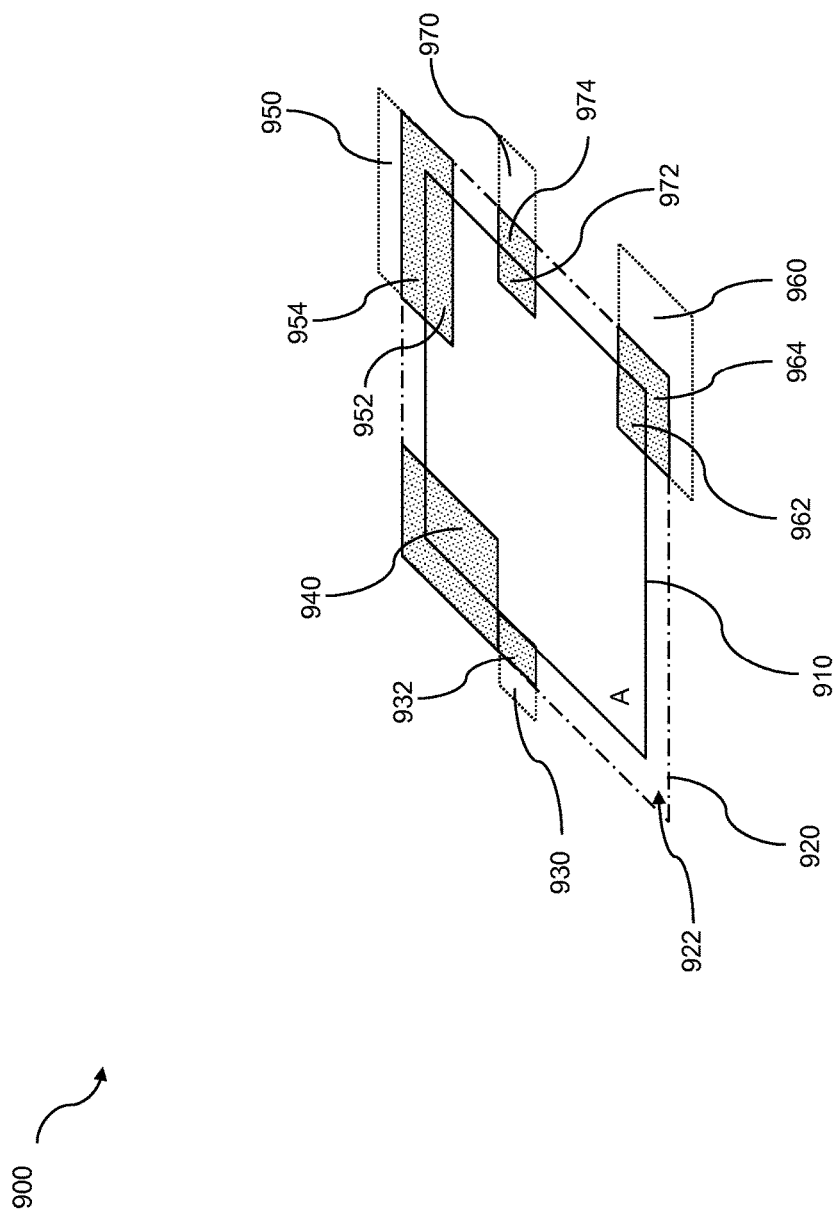
FIG. 9 shows an example merged virtual layer of Cell A for a given hierarchical layout.

FIG. 9 shows an example merged virtual layer 900 of Cell A for a given hierarchical layout. The example virtual layer 900 is based on the hierarchical semiconductor design layout 500 of FIG. 5 and includes augmented information as shown in both FIG. 7 and FIG. 8. In the example given, the original cell boundary 910 has been moved by an ambit amount to create an expanded cell boundary 920 that includes an ambit area 922 surrounding the original cell boundary 910. The expanded cell boundary 920 is included to determine whether a shape overlaps with the cell. So the example merged virtual layer 900 includes accumulated overlapping shape data of shapes overlapping a region adjacent to a cell instance.

The first instance 430 of Cell A 300 in the design layout 500 overlaps with an original shape 950, which is the same shape as the rectangle 420 of Cell B 400. A first portion 952 of the rectangle overlaps with the original cell and a second portion 954 overlaps with the ambit area 922. Both the first portion 952 and the second portion 954 are included in the virtual layer in this example. Other embodiments do not include the second portion 954 of the rectangle 950. The first instance 430 of Cell A 300 also overlaps with an original shape 930, which is the same shape as the rectangle 422 of Cell B 400. A portion 932 of the shape 930 overlaps with the ambit area 922, but none of the original shape 930 overlaps the original cell. In this example, the portion 932 of the shape 930 is included in the virtual layer, but other embodiments do not include it because the portion 932 does not overlap the original cell boundary 910.

The second instance 440 of Cell A 300 in the design layout 500 overlaps with an original shape 960, which is the same shape as rectangle 420 of Cell B 400. The shape 960 is in a different position in the virtual layer because the second instance 440 of the cell is rotated 180 degrees in the design layout. A first portion 962 of the shape 960 overlaps with the original cell and a second portion 964 overlaps with the ambit area 922. Both the first portion 962 and the second portion 964 of the shape 960 are included in the virtual layer in this example. Other embodiments do not include the second portion 964. The second instance 440 of Cell A 300 also overlaps with an original shape 940, which is the same shape as rectangle 424 of Cell B 400. The entire shape 940 overlaps the oversized cell and is included in the virtual layer, but some embodiments do not include the portion of the shape 940 within the ambit area 922. In some embodiments, the amount of shape overlap within the ambit area is used as a design rule criterion. For example, in embodiments, if the amount (percentage) of shape overlap within the ambit area exceeds a predetermined threshold, then a warning is generated. The warning may be presented on a user interface (e.g. display screen). For example, in some embodiments, a warning is generated when the shape overlap percentage in the ambit area exceeds 30 percent. Thus, in embodiments, methods include determining an original cell boundary for the cell design, defining an oversized cell boundary that circumscribes the original cell boundary, defining an ambit area as an area between the original cell boundary and the oversized cell boundary, determining an amount of shape overlap within the ambit area, and generating a warning when the shape overlap percentage exceeds a predetermined value.

The first instance 430 and the second instance 440 of Cell A overlap each other and both overlap the shape 970 which is the same shape as the original rectangle 312. Because of the rotation of the second instance 440 of the cell, the overlaps occur in exactly the same spot, so the first portion 972 of the shape 970 can represent the portion of the rectangle 312 of the second instance 440 of the cell that overlaps the first instance 430 of the cell and the portion of the rectangle 312 of the first instance 430 of the cell that overlaps the second instance of the cell 440. The second portion 974 of the shape 970 represents both overlaps of the ambit area 922.

The merged virtual layers create a virtual hierarchical layer (VHL) for the Cell A 300 in the semiconductor design layout 500. The VHL can be represented in different ways, but in some embodiments, the VHL is a digital file that includes descriptions of the shapes of the VHL. A similar VHL can be created for other layers of the Cell A 300 or other cells in the design layout.

Figure 10:
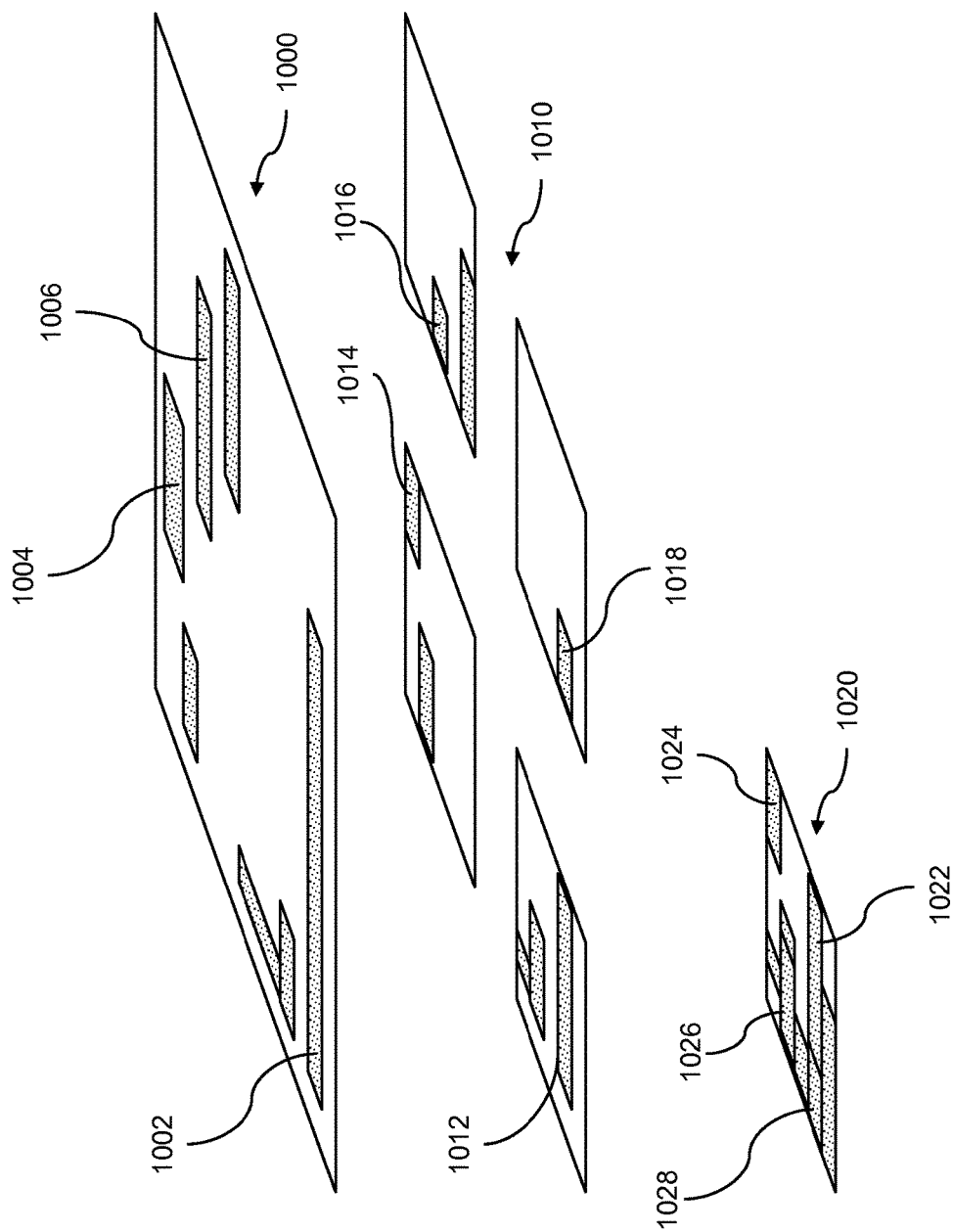
FIG. 10 shows an example of pushing a hierarchical layer into cells.

FIG. 10 shows an example of pushing a hierarchical layer into cells. The layer in the example can be extracted from one or more hierarchical levels, physical layout layers, logical design levels and so on. Any number of layers can be pushed into one or more cells. The example shown includes a cell 1000 of a design layout. The cell 1000 can be from any hierarchical level of the design layout. The cell 1000 includes shapes such as three rectangles, rectangle 1002, a rectangle 1004, and rectangle 1006. In at least one embodiment, the rectangles are all on the same layer of the design layout, but in other embodiments, the rectangles can be on more than one layer. The first cell 1000 also includes four instances of a child cell.

A second hierarchical level 1010 shows the four instances of the child cell with shapes from the first hierarchical level 1000 that overlap each instance. A first instance of the child cell includes several rectangles that are generated from overlapping shapes in the first hierarchical level 1000, including a rectangle 1012. A shape overlapping an instance can be said to traverse the instance. The rectangle 1012 represents the portion of the rectangle 1002 in the cell 1000 that overlaps, or traverses, the first instance of the child cell. A second instance of the child cell includes two rectangles that are generated from overlapping shapes in the first hierarchical level 1000, including a rectangle 1014. The rectangle 1014 represents the portion of the rectangle 1004 in the cell 1000 that overlaps the second instance of the child cell. A third instance of the child cell includes two rectangles that are generated from overlapping shapes in the first hierarchical level 1000, including a rectangle 1016. The rectangle 1016 represents the portion of the rectangle 1006 in the cell 1000 that overlaps the third instance of the child cell. A fourth instance of the child cell includes a single rectangle 1018. The rectangle 1018 represents the portion of the rectangle 1002 in the cell 1000 that overlaps the fourth instance of the child cell. A virtual layer is generated for each instance that includes the overlapping shapes from the first hierarchical layer. Thus, the example of FIG. 10 includes generating a virtual layer corresponding to one of the plurality of layers within the semiconductor design layout which includes one or more of the shapes which traverse the instance.

A virtual hierarchical layer (VHL) 1020 is generated by combining the virtual layers for each instance of the cell shown in the second hierarchical level 1010. The combining can be one way of augmenting the virtual layer of one of the instances. The VHL 1020 includes the rectangle 1012 from the first instance as a rectangle 1022, the rectangle 1014 from the second instance as a rectangle 1024, the rectangle 1016 from the third instance as a rectangle 1026 and the rectangle 1018 from the fourth instance as a rectangle 1028. The combining can represent hierarchical overlapping information that can be propagated to the virtual layer. The results of the combining can include rectangles, polygons, and complex polygons. For example, multiple rectangles resulting from combining the rectangles and polygons contained in the one or more instances of the child cells that overlap or touch one another can be converted to a complex polygon. Any number of rectangles, polygons, complex polygons, and so on can result from the combining.

Figure 11:
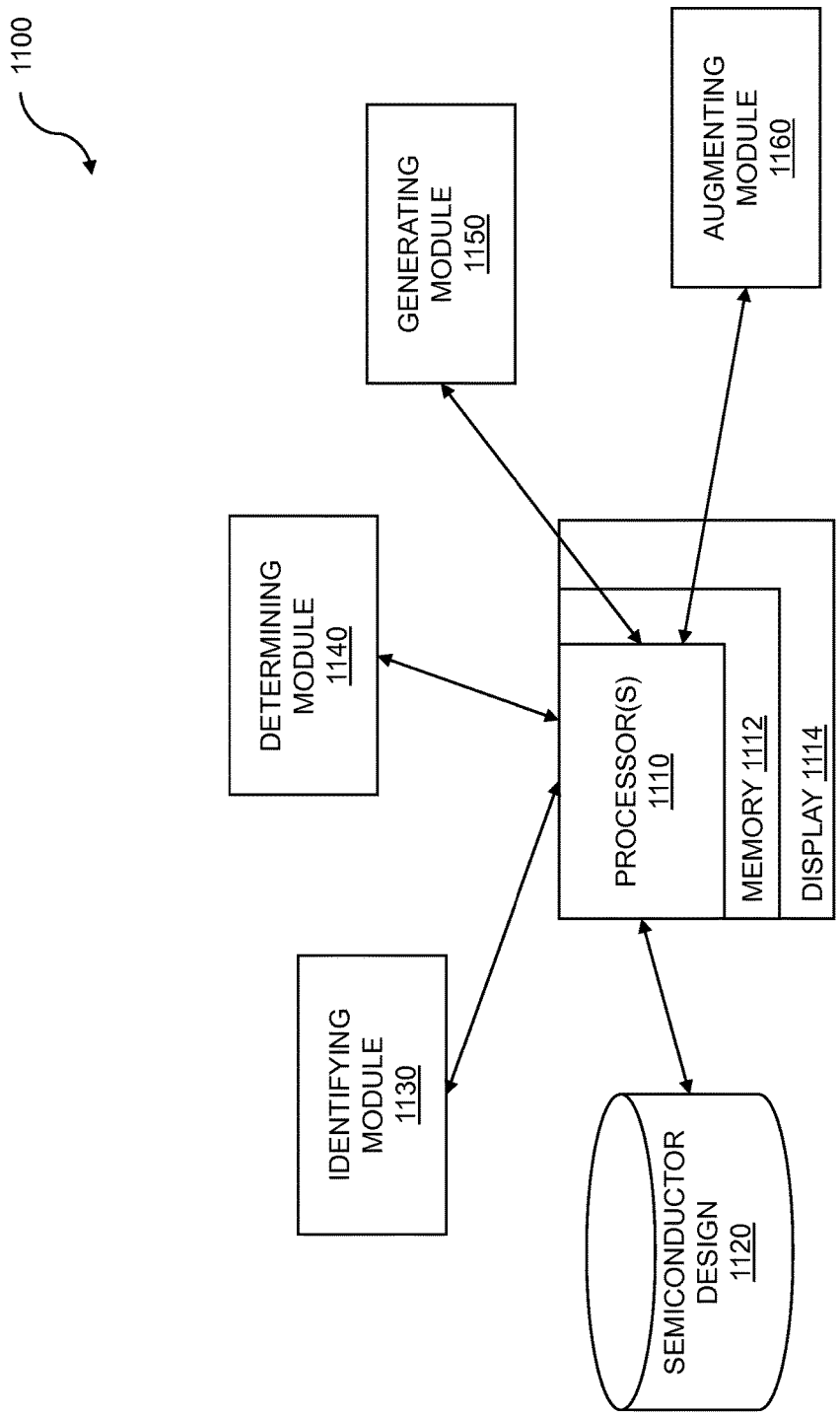
FIG. 11 is a system diagram for virtual hierarchical layer usage.

FIG. 11 is a system diagram for virtual hierarchical layer usage. The system 1100 can include one or more processors 1110 which are coupled to a memory 1112. The memory 1112 can be used to temporarily or permanently store computer code and computer instructions, and calculated, temporary, and permanent computer data. The data can include any appropriate type or types of data including data for one or more semiconductor design layouts. The design data can include layout information, layer information, mask information, optical information, design information, configuration information, test data and instructions, and the like. The data can include other types of data such as design rules for manufacturing information, design rule checking (DRC) information, DRC commands, one or more DRC runsets, system support information, analysis results, etc. A display 1114 is also included in some embodiments, and can be any electronic display, including but not limited to, a computer display, a laptop screen, a net-book screen, a tablet screen, a cell phone display, a mobile device display, a remote with a display, a television, a projector, or the like. An embodiment of a computer program running on the one or more processors 1110 is able to perform virtual hierarchical layer processing.

A semiconductor design 1120 is stored on a computer readable media, which can be included in any appropriate type of storage device including a hard disk drive (HDD), a solid-state drive (SSD), or an optical storage media. The semiconductor design can include descriptions of layers, hierarchies of layers, descriptions of rectangles and polygons, or any other type of description of the physical design of an IC.

An identifying module 1130 can be included in the system 1100. The identifying module 1130 can be used to identify a cell design within the semiconductor design layout 1120. The identified cell can be a sibling cell, a direct sibling cell, an indirect sibling cell, and so on. A determining module 1140 can be included in the system 1100. The determining module 1140 can be used to determine an instance of a cell design and to determine shapes which transverse the instance. The shapes can be included in one or more layers in a hierarchy of layers. The shapes can be rectangles, polygons, complex polygons, and so on. A generating module 1150 can be included in system 1100. The generating module 1150 can be used to generate a virtual layer corresponding to one of the plurality of layers within the semiconductor design layout which includes one or more of the shapes which traverse the instance. Any number of virtual layers can be generated. The one or more shapes which traverse the instance can overlap in the virtual layer. The overlapping shapes can be combined into rectangles, polygons, complex polygons, and so on, in the virtual layer. The rectangles, polygons and complex polygons can be represented in a single virtual layer or multiple virtual layers. Multiple virtual layers can be generated to represent multiple hierarchical layers which traverse the instance, for example. The one or more virtual layers can be used to reduce the complexity of the one or more DRC and DRM operations. An augmenting module 1160 can be included in system 1100. The augmenting module 1160 can be used to augment the virtual layer with information on other shapes which traverse other instances of the cell design within the semiconductor design layout. The augmenting can further add rectangles, polygons, complex polygons, and so on, to the virtual layer. The augmenting can include information on edges of the cell. The augmenting can flatten the additional rectangles, polygons, complex polygons, etc., into the virtual layer. The augmenting can reduce the complexity of the one or more DRC and DRM operations.

The system 1100 can include a computer program product for virtual hierarchical layer. The computer program product can be embodied in a non-transitory computer readable medium and can comprise code for obtaining a semiconductor design layout including a plurality of layers and a plurality of hierarchical levels, code for identifying a cell design within the semiconductor design layout, code for determining an instance of the cell design and shapes which traverse the instance, code for generating a virtual layer corresponding to one of the plurality of layers within the semiconductor design layout which includes one or more of the shapes which traverse the instance, and code for augmenting the virtual layer with information on other shapes which traverse other instances of the cell within the semiconductor design layout.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for generating a layout of a semiconductor integrated circuit, the method comprising:
identifying a cell design within a semiconductor design layout that includes a plurality of layers and a plurality of hierarchical levels;
determining an instance of the cell design and shapes which traverse the instance;
generating a virtual layer corresponding to one of the plurality of layers within the semiconductor design layout which includes one or more of the shapes which traverse the instance;
augmenting the virtual layer with information on other shapes which traverse other instances of the cell design within the semiconductor design layout; and
accumulating overlapping shape data of shapes overlapping a region adjacent to the instance.

2. The method of claim 1 wherein the other instances include a mirroring of the cell design.

3. The method of claim 1 wherein the other instances include a rotating of the cell design.

4. The method of claim 1 further comprising repeating the identifying, determining, generating, and augmenting for a second virtual layer corresponding to a second layer from the plurality of layers.

5. The method of claim 4 further comprising performing a combination of the virtual layer and the second virtual layer.

6. The method of claim 5 wherein the combination is used in analyzing the semiconductor design layout.

7. The method of claim 6 wherein the analyzing is performed to identify weak spots in the semiconductor design layout.

8. The method of claim 5 wherein a further virtual layer is created based on the combination.

9. The method of claim 1 wherein the virtual layer generated for analysis is formed from a union of shapes from the instance and the other instances.

10. The method of claim 1 wherein the virtual layer includes information on edges of the cell design.

11. The method of claim 1 further comprising pushing the overlapping shape data into a boundary of the region.

12. The method of claim 1 wherein the virtual layer includes compressed hierarchical data.

13. The method of claim 1 wherein the determining the instance is accomplished by searching through a physical hierarchy of the semiconductor design layout.

14. The method of claim 13 wherein the physical hierarchy is analyzed based on a logical hierarchy of a design based on the semiconductor design layout.

15. The method of claim 13 wherein the searching further comprises determining the other instances.

16. The method of claim 1 wherein the augmenting includes one or more of modifying a shape in the virtual layer, describing a distance to a neighboring shape, or describing a layout level of concern.

17. The method of claim 1 wherein the other shapes are based on a different layer than the one of the plurality of layers.

18. The method of claim 1, further comprising:
determining an original cell boundary for the cell design;
defining an oversized cell boundary that circumscribes the original cell boundary;
defining an ambit area as an area between the original cell boundary and the oversized cell boundary;
determining an amount of shape overlap within the ambit area; and
generating a warning when a shape overlap percentage exceeds a predetermined value.

19. A computer system for generating a layout of a semiconductor integrated circuit, the computer system comprising:
a memory which stores instructions;
one or more processors coupled to the memory wherein the one or more processors are configured to:
identify a cell design within a semiconductor design layout that includes a plurality of layers and a plurality of hierarchical levels;
determine an instance of the cell design and shapes which traverse the instance;
generate a virtual layer corresponding to one of the plurality of layers within the semiconductor design layout which includes one or more of the shapes which traverse the instance;
augment the virtual layer with information on other shapes which traverse other instances of the cell design within the semiconductor design layout; and
accumulate overlapping shape data of shapes overlapping a region adjacent to the instance.

20. The system of claim 19 further configured to repeat the identifying, determining, generating, augmenting, and accumulating for a second virtual layer corresponding to a second layer from the plurality of layers.

21. The system of claim 20 further configured to perform a combination of the virtual layer and the second virtual layer.

22. The system of claim 21 wherein the combination is used in analyzing the semiconductor design layout.

23. A computer program product embodied in a non-transitory computer readable medium, which when executed by a processor, causes the processor to generate a layout of a semiconductor integrated circuit, the computer program product comprising instructions that when executed cause the processor to:
identify a cell design within a semiconductor design layout that includes a plurality of layers and a plurality of hierarchical levels;
determine an instance of the cell design and shapes which traverse the instance;
generate a virtual layer corresponding to one of the plurality of layers within the semiconductor design layout which includes one or more of the shapes which traverse the instance;
augment the virtual layer with information on other shapes which traverse other instances of the cell design within the semiconductor design layout; and
accumulate overlapping shape data of shapes overlapping a region adjacent to the instance.

24. The computer program product of claim 23 that further causes the processor to repeat the identifying, determining, generating, augmenting, and accumulating for a second virtual layer corresponding to a second layer from the plurality of layers.

25. The computer program product of claim 24 that further causes the processor to perform a combination of the virtual layer and the second virtual layer.

26. The computer program product of claim 25 wherein the combination is used in analyzing the semiconductor design layout.

* * * * *